(12) United States Patent
Kyzivat (10) Patent No.: US 9,258,367 B2
(45) Date of Patent: Feb. 9, 2016

(54) TECHNIQUE FOR MANAGING SESSIONS WITH ENTITIES IN A COMMUNICATION NETWORK

(75) Inventor: Paul Kyzivat, Hudson, MA (US)

(73) Assignee: Cisco Technology, Inc., San Jose, CA (US)

( * ) Notice: Subject to any disclaimer, the term of this patent is extended or adjusted under 35 U.S.C. 154(b) by 1728 days.

(21) Appl. No.: 11/497,704

(22) Filed: Aug. 1, 2006

(65) Prior Publication Data

US 2008/0032691 A1 Feb. 7, 2008

(51) Int. Cl.
*G06F 15/16* (2006.01)
*H04W 4/00* (2009.01)
*H04L 29/08* (2006.01)
*H04L 29/06* (2006.01)

(52) U.S. Cl.
CPC .............. *H04L 67/14* (2013.01); *H04L 67/143* (2013.01); *H04L 65/1006* (2013.01); *H04L 67/147* (2013.01); *H04L 67/22* (2013.01)

(58) Field of Classification Search
CPC ..... H04L 65/1006; H04L 67/24; H04L 67/14; H04L 67/143; H04L 67/22
USPC ........................................ 709/227; 455/435.1
See application file for complete search history.

(56) References Cited

U.S. PATENT DOCUMENTS

| | | | |
|---|---|---|---|
| 6,965,917 B1* | 11/2005 | Aloni et al. | 709/206 |
| 2004/0176091 A1* | 9/2004 | Bajko et al. | 455/435.1 |
| 2006/0070083 A1* | 3/2006 | Brunswig et al. | 719/318 |
| 2006/0089167 A1* | 4/2006 | Idnani | 455/518 |
| 2008/0113669 A1* | 5/2008 | Shi | 455/435.1 |
| 2009/0300158 A1* | 12/2009 | Bobde et al. | 709/223 |

OTHER PUBLICATIONS

Parameshwar, N., et al., "Advanced SIP Series: SIP and 3GPP Operations", Award Solutions, pp. 1-10.
"IP Multimedia Subsystem", http://en.wikipedia.ora/wiki/IP_Multimedia Subsystem, pp. 1-9.
"Session Border Control Functions in IMS-based Converged Networks", Newport Networks Ltd., 2005 pp. 1-13.
"Understanding SIP Today's Hottest Communications Protocol Comes of Age", Ubiquity Software Corporation, white paper, pp. 1-5.
Bushnell, B., "Using the IMS Architecture for Service Enabling Next Generation Networks", Converge: Network Digest, Aug. 9, 2004.

(Continued)

*Primary Examiner* — David Lazaro
*Assistant Examiner* — Xiang Yu (57) ABSTRACT

A technique for managing sessions in a communication network that does not subscribe to registration events immediately after an entity in the network is registered but rather delays subscribing to these events until a time that such notification would be normally used, such as after a revocable session has been established with the entity. An entity registers to enable sessions to be established with other entities in the communication network. After a session is established, a check is performed to determine if a subscription to be notified of events that warrants revoking the session already exists. If not, a subscription is established to be notified of events that warrant revoking the session. If during the session a notification is received indicating that an event that warrants revoking the session has occurred, the session is revoked.

10 Claims, 9 Drawing Sheets

(56) References Cited

OTHER PUBLICATIONS

Kyzivat, P., "Reg Event Package Extension for GRUUs", Internet Draft, draft-ietf-sipping-gruu-reg-event-00, Internet Engineering Task Force (IETF), Sep. 30, 2005, pp. 1-12.

Niemi, A., "Requirements for Instant Messaging in 3GPP Wireless Systems", draft-niemi-simple-im-wireless-reqs-02, IETF, Oct. 15, 2003, pp. 1-12.

Shulzrinne, H., et al., "RTP: A Transport Protocol for Real-Time Applications", Request for Comments (RFC): 3550, IETF, Jul. 2003, pp. 1-104.

Roach, A. B., "Session Initiation Protocol (SIP)—Specific Event Notification", RFC 3265, IETF, Jun. 2002, pp. 1-38.

Rosenberg, J., "A Session Initiation Protocol (SIP) Event Package for Registrations", RFC: 3680, IETF, Mar. 2004, pp. 1-26.

Rosenberg, J., et al., "SIP: Session Initiation Protocol", RFC: 3261, IETF, Jun. 2002, pp. 1-269.

\* cited by examiner

TECHNIQUE FOR MANAGING SESSIONS WITH ENTITIES IN A COMMUNICATION NETWORK

BACKGROUND

The move from conventional telephony networks to Internet Protocol (IP) based telecommunication networks is rapidly gaining pace. Multimedia architectures, such as the IP Multimedia Subsystem (IMS) architecture, are being adopted by various telecommunications services to support this movement and provide both mobile and fixed IP-based services to users. IMS is an architecture that uses the IP protocol to provide various services now available from IP-based networks, such as the Internet, to, e.g., various users.

Voice over IP (VoIP) refers to a group of technologies that may be used to transmit voice information over communication networks from a source (calling party) to a destination (called party). Such networks typically include a plurality of VoIP devices (user equipment) that may convert voice and/or video information from its traditional form to a form that is suitable for packet transmission. In other words, the VoIP device encodes, compresses and encapsulates the information into a plurality of data packets that are suitable for being carried by a communication network. Examples of VoIP devices include IP telephones, VoIP network interfaces, certain private branch exchanges (PBXs), personal computers (PCs) running communication applications, certain personal digital assistants (PDAs), network devices providing voice gateway services and so on.

For calls made using VoIP, IMS-based networks typically employ a session protocol to establish sessions (connections) that support the calls. An example of a session protocol that is commonly used is the well-known Session Initiation Protocol (SIP) as described in J. Rosenberg et al., "SIP: Session Initiation Protocol," Internet Engineering Task Force (IETF) Request For Comments (RFC) 3261. SIP operates at the application layer of the Open Systems Interconnection Reference Model (OSI-RM) and is defined to establish and maintain sessions between users agents (UAs) at user equipment (UE) in a communication network.

In accordance with SIP, when a UA comes on-line, it typically registers with a registration service (registrar) using a SIP REGISTER message. The registrar maintains information about the UA which may include its location, how to reach it and authentication information associated with the UA that may be used to authenticate the UA. Typically, after a UA is registered, the UA is available to receive as well as initiate calls.

In a typical VoIP network, when a call is initiated by a calling party (caller) to a called party, a session is established between the caller and called parties' UAs to support the call. Establishing a session between the parties often involves (a) authenticating both parties and (b) successfully exchanging a sequence of messages between the parties in a predetermined manner. Authentication may involve ensuring the parties have permission to establish the call in the network. The sequence of messages may include (a) a SIP INVITE message issued by the calling party to initiate the session between the calling and called parties, (b) a SIP "200 OK" message issued by the called party to acknowledge the INVITE message and indicate the called party accepts participation in the session, followed by (c) a SIP ACK (acknowledgement) message issued by the calling party to acknowledge the called party's acceptance. After the session is established, a media channel (media stream) may then be established using SIP and associated with the session. The Real-time Transport Protocol (RTP) may be used to transport information in the media channel. RTP is described in H. Schulzrinne et al., "RTP: A Transport Protocol for Real-Time Applications," IETF RFC 3550.

In some IMS implementations, a Proxy-Call Session/Control Function (P-CSCF) server associated with a UA maintains an awareness of the registration status of the UA in order to determine if sessions established by the UA should be revoked based on the registration status of the UA. For example, if the registration status of a UA changes from "is registered" to "no longer is registered," the P-CSCF may choose to revoke any outstanding sessions in which the UA is participating. In a typical arrangement, the P-CSCF enters a subscription with a Serving-Call Session/Control Function (S-CSCF) the UA has registered with to be notified of changes in the registration status of the UA. The S-CSCF acts as a registrar that the UA has registered with. If the registration status of the UA changes, the S-CSCF notifies the P-CSCF of the change and the P-CSCF may, in turn, respond accordingly (e.g., terminate any sessions engaged by the UA).

Figure 1:
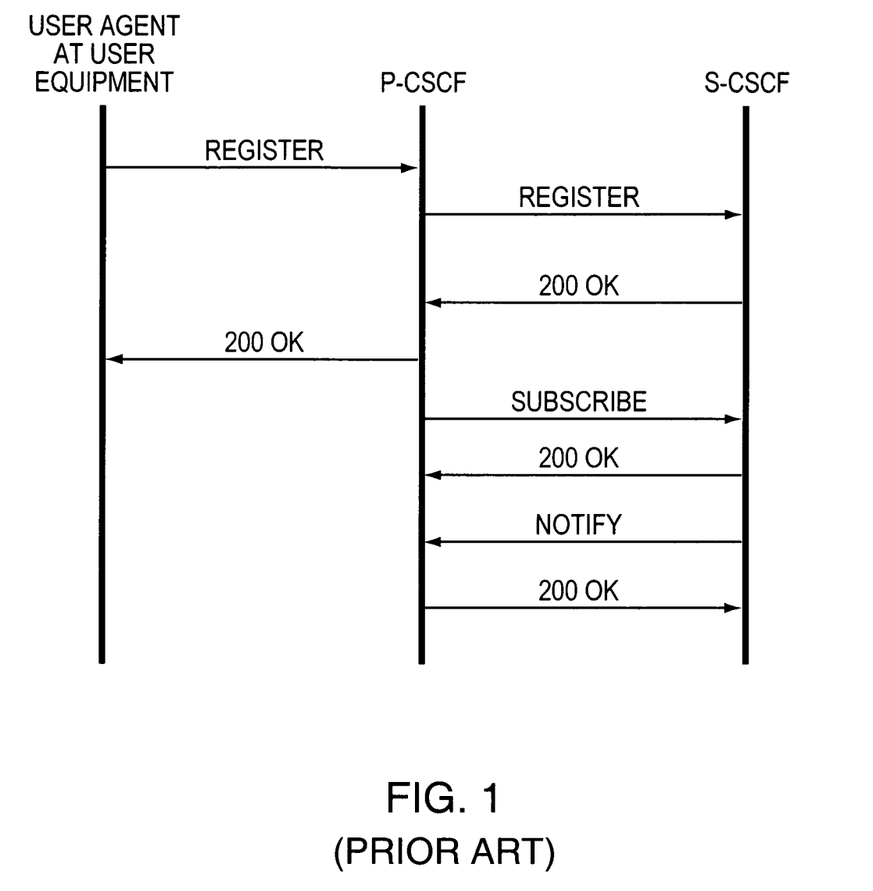
FIG. 1 illustrates an exchange of messages between a user agent (UA), a Proxy-Call Session/Control Function (C-CSCF) server and Serving-Call Session/Control Function (S-CSCF) server that involves registering the UA with the S-CSCF and establishing a subscription between the P-CSCF and the S-CSCF to be notified of changes in the UA's registration status.

FIG. 1 illustrates a typical exchange of messages between a UA, a P-CSCF and an S-CSCF where the UA registers with the S-CSCF and the P-CSCF subscribes to be notified of changes to the UA's registration status. Referring to FIG. 1, the UA registers with the S-CSCF by generating and forwarding a SIP REGISTER message to the S-CSCF. The message travels to the S-CSCF via the P-CSCF which receives the SIP REGISTER message, notes that the UA is registering with the S-CSCF and forwards the message to the S-CSCF. The S-CSCF receives the message and processes it which may include verifying that the UA has permission to register with the S-CSCF. Assuming that the registration request is accepted by the S-CSCF, the S-CSCF responds with a SIP "200 OK" message.

The "200 OK" message travels to the P-CSCF which notes that the UA has successfully registered with the S-CSCF. At this point, the P-CSCF knows that it needs to establish a subscription with the S-CSCF to monitor the status of the UA's registration. The P-CSCF forwards the "200 OK" message to the UA which receives the "200 OK" message and concludes that it has successfully registered with the S-CSCF. Meanwhile, the P-CSCF generates and forwards a SIP SUBSCRIBE message to the S-CSCF in order to be notified of any changes to the UA's registration status. The S-CSCF receives the subscribe message and processes it including establishing a subscription for the P-CSCF and, generating and forwarding a "200 OK" message to the P-CSCF. The P-CSCF receives the "200 OK" message and concludes that the subscription is "active." In addition to the "200 OK" message, the S-CSCF also generates and forwards a SIP NOTIFY message to the P-CSCF to notify it of the UA's current registration status. The P-CSCF receives the NOTIFY message and responds to it by generating and forwarding a "200 OK" message to the S-CSCF. The S-CSCF receives the "200 OK" message and concludes that the P-CSCF has successfully received the notification.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A description of preferred embodiments of the invention follows.

It should be noted that illustrated embodiments of the present invention, described herein, are described as using the Session Initiation Protocol (SIP) to establish and maintain sessions in a communication network as well as exchange information in the network. A version of the SIP protocol that may be used with the present invention is described in J. Rosenberg, et al., "SIP: Session Initiation Protocol," Request For Comments (RFC) 3261, June 2002, A. B. Roach, "Session Initiation Protocol (SIP)-Specific Event Notification," RFC 3265, June 2002, and J. Rosenberg, "A Session Initiation Protocol (SIP) Event Package for Registrations," RFC 3680, March 2004 all of which are available from the Internet Engineering Task Force (IETF) and all of which are incorporated by reference in their entirely as though fully set forth herein. It should be noted that other session protocols may be adapted to take advantage of aspects of the present invention.

One problem with the arrangement illustrated in FIG. 1 is that since each registration of a user agent (UA) involves a multitude of messages (i.e., a REGISTER message, three "200 OK" messages, a SUBSCRIBE message and a NOTIFY message). A network may become overwhelmed by the registration process due to a sudden peak of message activity that may occur if a large number of UAs were to suddenly register at the same time. For example, assume that many thousands of UAs are serviced by the same Serving-Call Session/Control Function (S-CSCF) server and that the S-CSCF server loses the UAs' registration and subscription information due to, e.g., a power-failure. When power is restored to the S-CSCF, the UAs must re-register with the S-CSCF. In addition, the Proxy-Call Session/Control Function (P-CSCF) associated with the UAs must re-subscribe with the S-CSCF. This could potentially cause an "avalanche" of messaging activity which could inundate the network's resources and may lead to, e.g., data loss and/or network outages.

The present invention overcomes shortcomings associated with prior art techniques by incorporating a technique that does not subscribe to be notified of events that affects an entity's registration immediately after the entity is registered but rather delays subscribing to events until a time that such notification would be normally used, such as at a time when a session is to be established with the entity.

According to an aspect of the technique, when a session is established with the entity, if the session may be revoked after the occurrence of certain events, a check is performed to determine if a subscription to be notified of the events that warrants revoking the session already exists. If not, a subscription to be notified of the events that warrant revoking the session is established.

Advantageously, the present invention is an improvement over prior art techniques in that it delays establishing a subscription to be notified of events, e.g., relating to an entity's registration until a time such notification may likely be used rather than perfunctorily after the entity has registered. Moreover, the time in which messaging traffic is introduced into the network is distributed more broadly based on a random nature of calls being initiated. Thus, the amount of messaging traffic that is present after an entity registers is reduced and distributed more broadly. Reducing the amount of messaging activity after an entity registers and distributing messaging activity more broadly helps avoid "avalanches" of messages that may occur when multiple entities attempt to register at the same time. Thus, the present invention acts to reduce message "avalanches" that may normally occur using techniques associated with prior art techniques.

Figure 2:
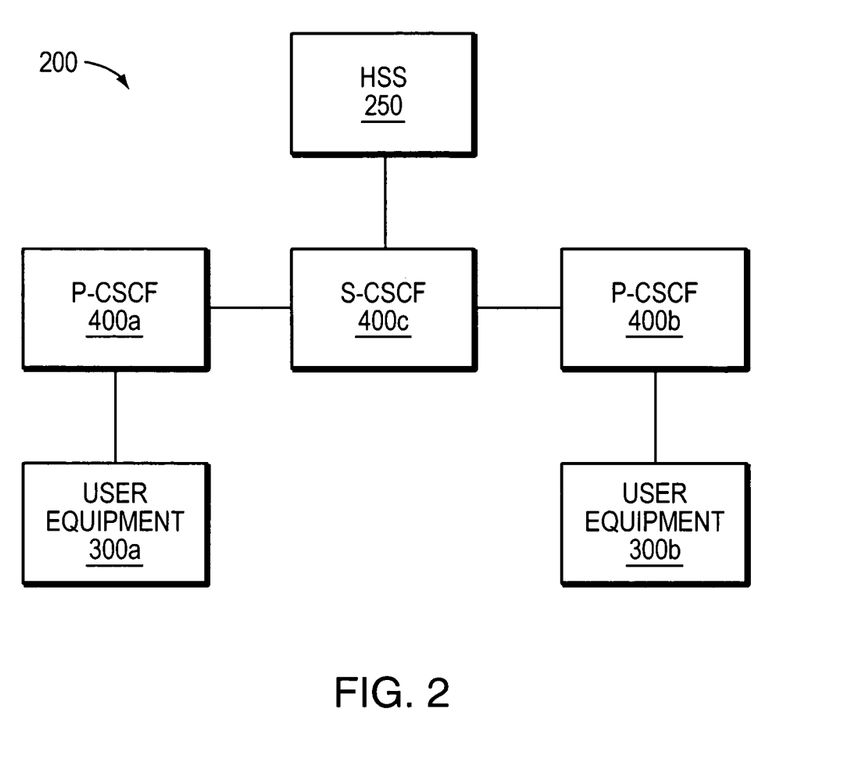
FIG. 2 is a block diagram of an exemplary communication network that may implement the present invention.

FIG. 2 is a high-level block diagram of an exemplary communication network that may be used with the present invention. Network 200 comprises a plurality of nodes, such as user equipment (UE) 300, intermediate nodes 400 and home subscriber server (HSS) 250 coupled to form an internetwork of nodes. These internetworked nodes communicate utilizing various protocols, such as the SIP protocol and the Internet Protocol (IP). A network protocol as used herein is a formal set of rules that define how data is exchanged between nodes in a communication network.

The HSS 250 is a conventional home subscriber server that may contain a database of subscribers that access the network 200. The database may include data about each subscriber, such as the subscriber's identity, names of an S-CSCF and P-CSCF associated with the subscriber, a roaming profile of the subscriber and authentication parameters that are used to authenticate the subscriber. In addition, the HSS may be configured to provide traditional home location register (HLR) and authentication center (AUC) functions to enable a subscriber to access various packet and circuit domains within the network 200 using various authentication schemes, such as the International Mobile Subscriber Identity (IMSI) scheme.

The UEs 300 are conventional communication devices, such as personal computers, personal digital assistants (PDA), mobile telephones, IP phones and the like, that enable subscribers to communicate with each other via the network 200. An example of a UE device 300 that may be used with the present invention is the Cisco SIP IP phone 7960, available from Cisco Systems, Inc., San Jose, Calif.

Figure 3:
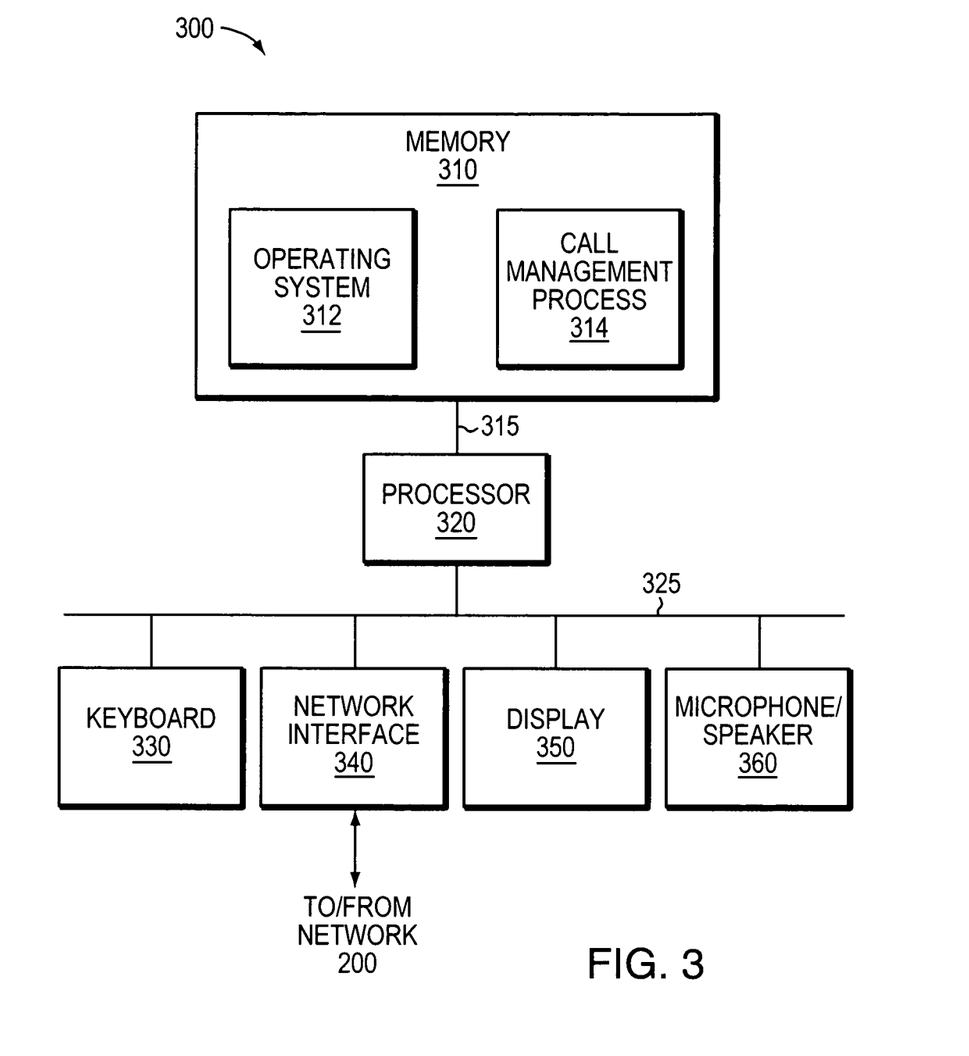
FIG. 3 is a block diagram of an exemplary user equipment (UE) device that may be used with the present invention.

FIG. 3 is a high-level block diagram of an exemplary UE device 300 that may be used with the present invention. Device 300 comprises a memory 310, a processor 320, a keyboard 330, a network interface 340, a display unit 350 and a microphone/speaker 360. The memory 310 is coupled to the processor 320 via a memory bus 315 which enables data to be transferred between the memory 310 and the processor 320. Likewise, the processor 320 is coupled to the keyboard 330, network interface 340, display 350, and microphone/speaker 360, via an input/output (I/O) bus which enables data to be transferred between the processor 320 and these devices.

The keyboard 330 is a conventional keyboard device that enables information to be input into the UE device 300, e.g., by a user. The processor 320 is a conventional central processing unit (CPU) configured to execute computer-executable instructions and manipulate data contained in memory 310 including instructions and data that implement aspects of the present invention. The display unit 350 is a conventional display unit that enables images (e.g., graphics, text, icons, pictures) to be displayed on the UE device 300. The microphone/speaker 360 enables audio to be input into the UE device 300 as well as output from the UE device 300. The network interface 340 comprises conventional circuitry configured to implement a conventional network interface that enables data to be transferred between the UE device 300 and the network 200.

The memory 310 is a computer-readable medium implemented as a random access memory (RAM) comprising RAM devices, such as dynamic RAM (DRAM) devices and/or flash memory devices. Memory 310 contains various software and data structures used by the processor 320 including software and data structures that implement aspects of the present invention. Specifically, memory 310 includes an operating system 312 and a call management process 314.

The operating system 312 is a conventional operating system that contains various software functions that support processes (e.g., call management process 314) that execute on processor 320. These software functions perform various conventional operating system functions, such as enabling the processes to be scheduled for execution on processor 320 as well as provide the processes controlled access to various resources in UE device 300. Call management process 314 comprises software functions configured to, inter alia, establish and maintain sessions (e.g., VoIP telephone calls) with other devices in the network 200 in accordance with aspects of the present invention.

Figure 4:
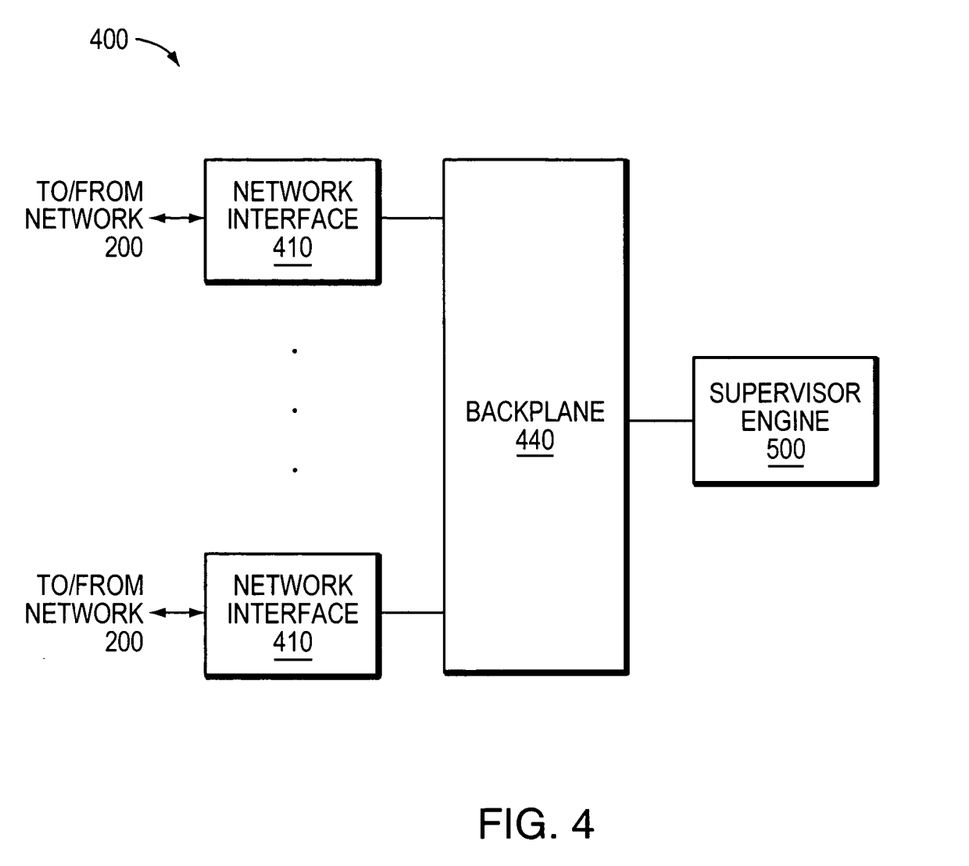
FIG. 4 is a high-level block diagram of an exemplary intermediate node that may be used with the present invention.

As noted above, network 200 comprises various intermediate nodes 400. These nodes may be configured to perform various roles in the IMS network 400, such as roles performed by conventional S-CSCFs and P-CSCFs. FIG. 4 is a high-level block diagram of an exemplary intermediate node 400 that may be used with the present invention.

Intermediate node 400 is illustratively a router configured to perform various conventional layer-2 (L2) and layer-3 (L3) switching and routing functions as well as functions related to managing sessions in accordance with aspects of the present invention. As used herein, L2 and L3 refer to the data link layer and network layer, respectively, of the well-known Open Systems Interconnection Reference Model (OSI-RM). Intermediate node 400 may also be configured to support various combinations of protocols including, e.g., Open Shortest Path First (OSPF), Intermediate-System-to-Intermediate-System (IS-IS), Transport Control Protocol/Internet Protocol (TCP/IP), SIP and so on. Routers that may be used to implement intermediate nodes 400 include the Cisco Series 7600 routers available from Cisco Systems, Inc.

Intermediate node 400 comprises one or more network interface cards 410, a backplane 440 and a supervisor engine card 500. The network interface cards 410 interface the intermediate node 400 with the network 200 and enable the intermediate node 400 to communicate with other entities in the network 400 by transferring data between the entities using various protocols, such as Asynchronous Transfer Mode (ATM), frame relay (FR), Ethernet and so on. To that end, cards 410 comprise conventional interface circuitry that incorporates signal, electrical and mechanical characteristics and interchange circuits needed to interface with the physical media of network 200 and the various protocols running over that media. Backplane 440 comprises a point-to-point interconnect bus that enables data to be transferred between the various cards contained in intermediate node 400.

Figure 5:
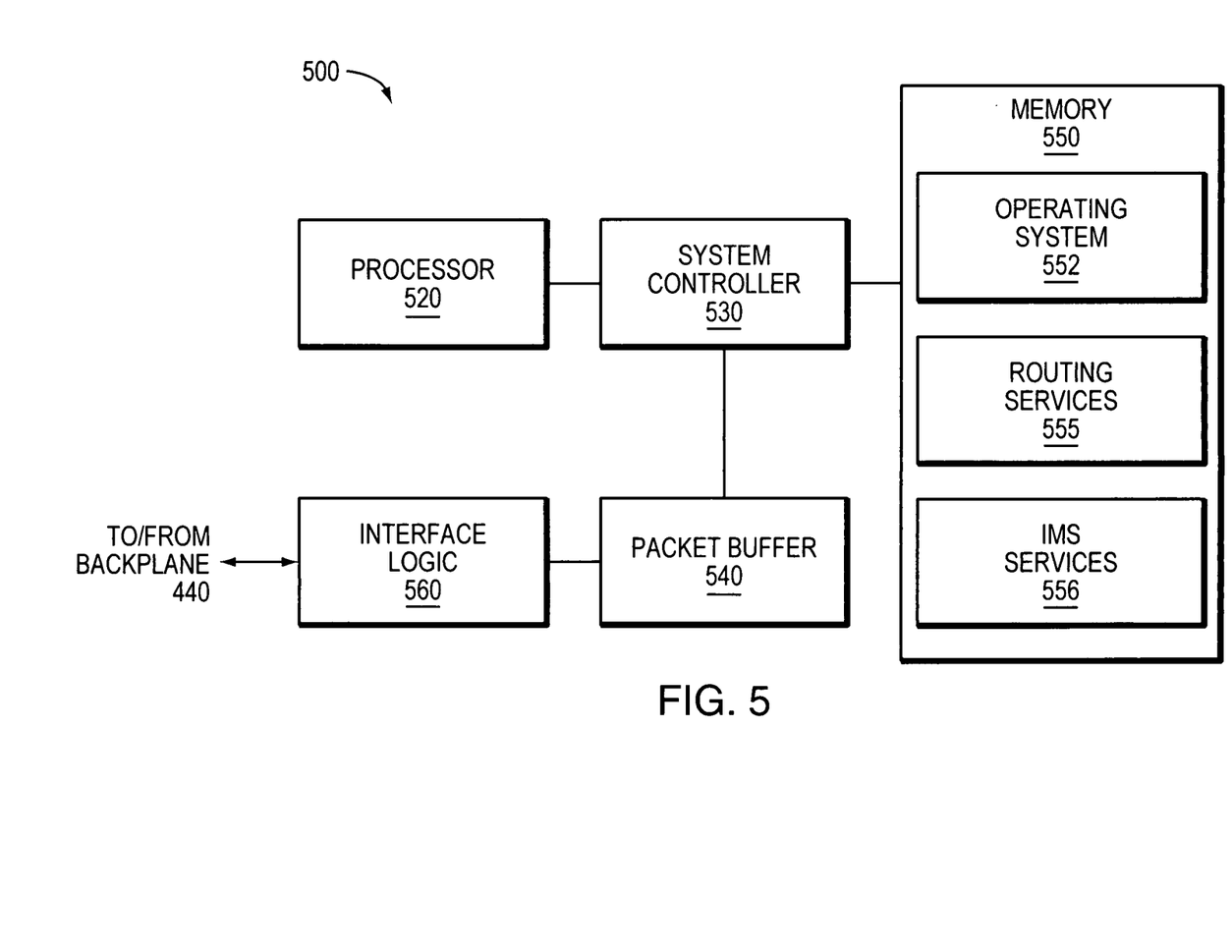
FIG. 5 is a high-level partial block diagram of a supervisor engine that may be used with the present invention.

The supervisor engine 500 performs various functions including executing routing protocols, processing packets and managing sessions in accordance with aspects of the present invention. FIG. 5 is a high-level block diagram of a supervisor engine 500 that may be used with the present invention. Supervisor engine 500 comprises interface logic 560, packet buffer 540, system controller 530, processor 520 and memory 550. The interface logic 560 is coupled to the backplane 440 and comprises logic configured to transfer data between the backplane 440 and the supervisor engine 500. The packet buffer 540 is illustratively a RAM comprising high-speed RAM devices capable of storing data packets acquired by the interface logic 560 and processed by the processor 520. The system controller 530 is coupled to the processor 520, memory 550 and packet buffer 540 and comprises circuitry configured to enable the processor 520 to access (e.g., read, write) memory locations contained in the memory 550 and the packet buffer 540. The processor 520 is a conventional CPU configured to execute instructions in memory 550 to perform various functions, such as executing various protocols, routing packets, managing intermediate node 400 as well as managing sessions in accordance with aspects of the present invention.

The memory 550 is a computer-readable medium comprising RAM devices, such as DRAM devices. Memory 550 contains various software and data structures including operating system 552, routing services 555 and IMS services 556. Operating system 552 is a conventional operating system that provides various conventional operating system functions including functions that schedule processes (e.g., routing services 555 and IMS services 556) for execution on processor 320 as well as control access to various resources in intermediate node 400.

Routing services 555 comprises software and data structures configured to implement various routing protocols, such as OSPF and IS-IS. These protocols may be configured to manage a forwarding database (FDB) (not shown) containing, e.g., data that is used to make forwarding decisions for forwarding packets processed by the intermediate node 400.

The IMS services 556 provide various conventional IMS related functions including functions associated with conventional P-CSCFs and S-CSCFs. In addition, IMS services provides various software functions, as will be described further below, that may be used to manage sessions associated with UAs including monitoring the registrations of UAs and, determining if an event associated with a registration has occurred that warrants terminating a session and, if so, instructing the UAs associated with the session to terminate the session.

Operationally, the network interfaces 410 acquire data packets from the network 200 and forward the data packets to the backplane 440. Packets destined for the supervisor engine 500 are acquired from the backplane 440 by the interface logic 560 which places the packets in the packet buffer 540. The processor 520 accesses the packets in the packet buffer 540 via the system controller 530 and processes them, e.g., using various functions provided by the routing 555 and/or IMS services 556. Packets processed by the supervisor engine 500 and destined for the network are forwarded from the packet buffer 540 via the interface logic 560 to appropriate network interfaces 410 via the backplane 440. The network interfaces 410 receive the packets and place them onto the network 200 for transfer to their destination.

It should be noted that functions performed by UE devices 300 and intermediate nodes 400, including functions that implement aspects of the present invention, may be implemented in whole or in part using some combination of hardware and/or software. It should be further noted that computer-executable instructions and/or computer data that implement aspects of the present invention may be stored in various computer-readable mediums, such as volatile memories, non-volatile memories, flash memories, removable disks, non-removable disks and so on. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention in, e.g., a communication network.

Figure 6:
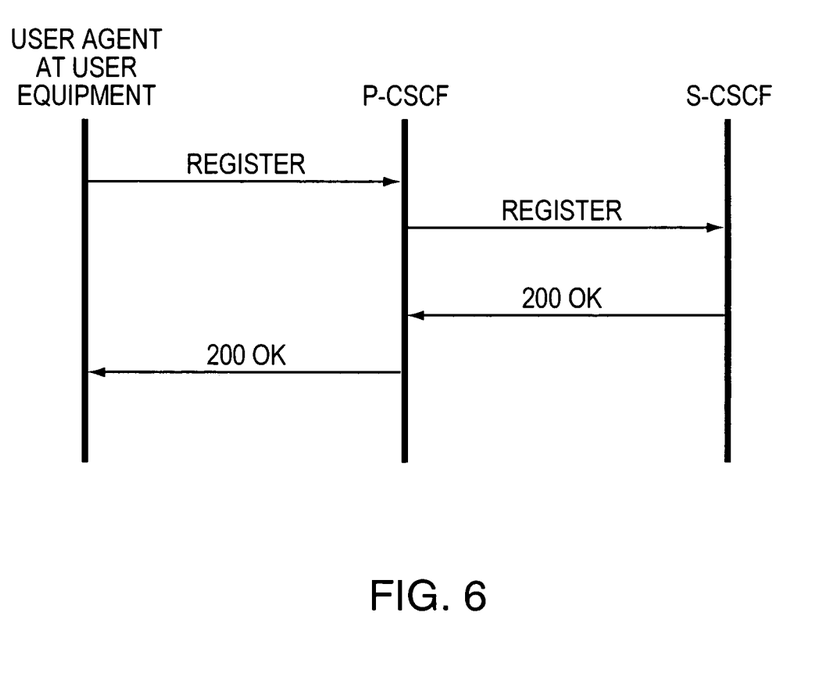
FIG. 6 illustrates an exchange of messages between a UA, a P-CSCF and an S-CSCF that involves registering the UA with the S-CSCF in accordance with an aspect of the present invention.

In network 200, UAs at the UEs 300 register with the S-CSCF 400c in order to participate in sessions (e.g., telephone calls) in network 200. FIG. 6 illustrates an exchange of messages between a UA at a UE 300, a P-CSCF associated with the UA and an S-CSCF in a communication network wherein the UA registers with the S-CSCF. The message exchange begins where the UA generates and forwards a SIP REGISTER message to the P-CSCF. The P-CSCF receives the REGISTER message, notes that the UA is attempting to register with the S-CSCF and forwards it to the S-CSCF. The S-CSCF receives the REGISTER message and processes it. This processing may include ensuring that the UE 300 is authorized to participate in sessions that are established in the network.

Assuming the UA is authorized to access the network, the S-CSCF registers the UA, generates a SIP "200 OK" message and forwards the "200 OK" message to the UA. The "200 OK" message is received by the UA's P-CSCF which notes that the UA has successfully registered with the S-CSCF and forwards the "200 OK" message to the UA. The UA receives the "200 OK" message and concludes that the UA is registered with the S-CSCF. At this point, the UA is registered with the S-CSCF and may participate in sessions in the network.

Note that, unlike the prior art illustrated in FIG. 1, in accordance with an aspect of the present invention, when a UA registers with an S-CSCF, a subscription to be notified of events involving the registration is not established. Rather, as will be described further below, this subscription is established after a session in which the UA is a participant is established. Holding off the subscription in this manner acts to reduce the amount of traffic generated when UAs register with an S-CSCF and therefore obviates conditions that may cause message avalanches.

In network 200, UAs that are registered with an S-CSCF may participate in sessions that have been originated by the UA or by another UA in the network 200. As noted above, these sessions may be associated with telephone calls. In accordance with an aspect of the present invention, after a session is established between two UAs in network 200, various subscriptions are established between the P-CSCFs associated with the UAs and the S-CSCF to enable the P-CSCFs to be notified of changes in the status of the UAs' registrations. Illustratively, the calling party establishes subscriptions to be notified of changes in its registration status. Likewise, illustratively, the called party establishes a subscription to be notified of changes in its registration only.

Figure 7:
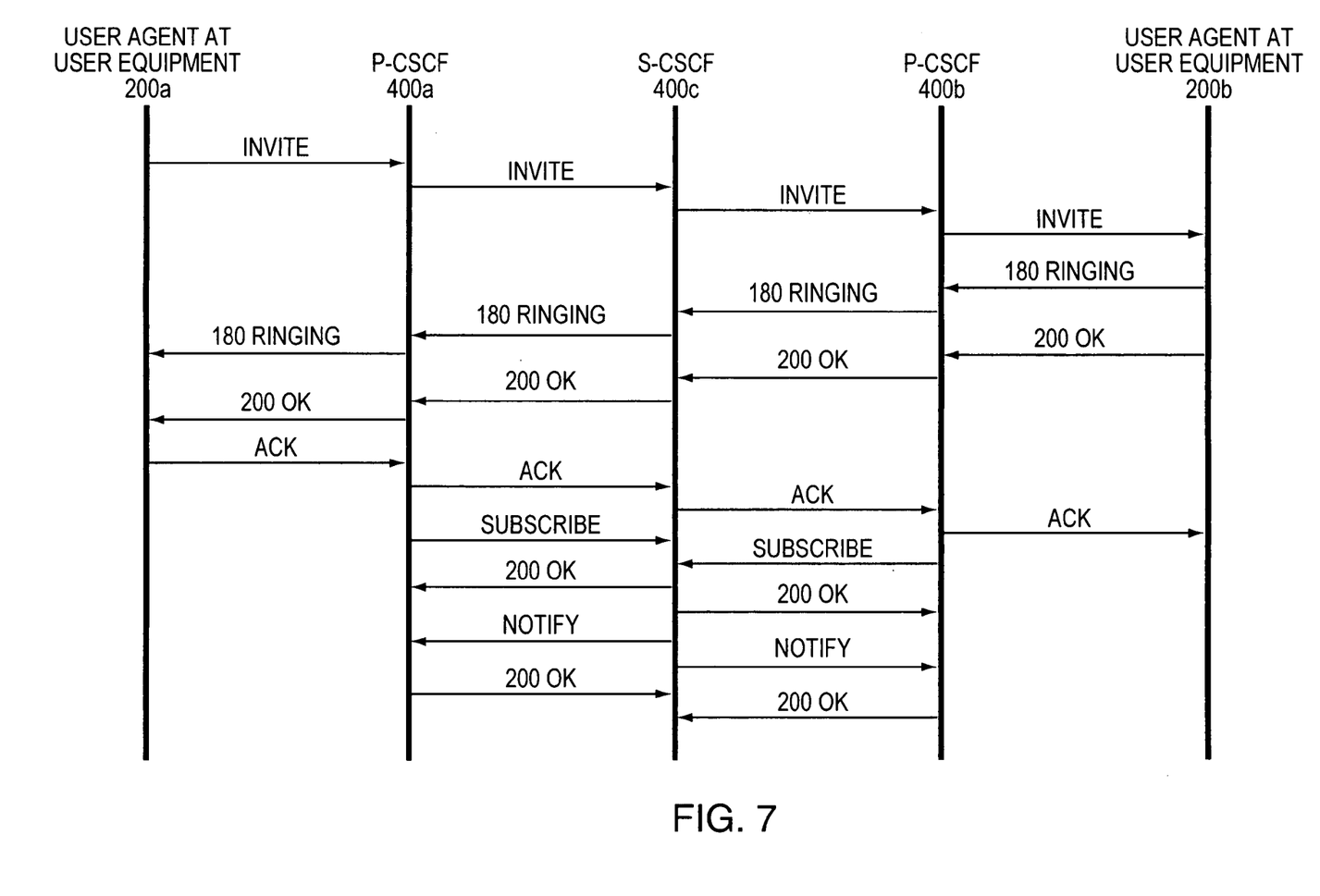
FIG. 7 illustrates an exchange of messages between two UAs, two P-CSCFs and a S-CSCF that involves establishing a session between the UAs and managing the session in accordance with an aspect of the present invention.

FIG. 7 illustrates an exemplary dialogue associated with establishing a session between a UA at UE 200a and a UA at UE 200b, and establishing subscriptions to monitor the registration status of the UAs in accordance with an aspect of the present invention. Assume that the UAs at UEs 200a, 200b have already registered with S-CSCF 400c, as described above. Further assume that P-CSCF 400a is the P-CSCF for the UA at UE 200a and that P-CSCF 400b is the P-CSCF for the UA at UE 200b.

The session begins where the UA at UE 200a generates a SIP INVITE message and forwards it towards the UA at UE 200b. P-CSCF 400a receives the INVITE message and notes that the UA at UE 200a is attempting to establish a session with the UA at UE 200b and forwards the INVITE message towards the UA at UE 200b. The S-CSCF 400c receives the INVITE message and forwards the INVITE message towards the UA at UE 200b. The P-CSCF 400b receives the INVITE message and forwards the generated message towards S-CSCF 400c. P-CSCF 400b then forwards the INVITE message towards the UA at UE 200b which receives the message, rings a telephone at UE 200b, generates a SIP "180 RINGING" message and forwards it towards the UA at UE 200a. The "180 RINGING" message travels towards the UA at UE 200a via nodes 400b, 400c and 400a. The UA at UE 200a receives the "180 RINGING" message and concludes that the telephone at UE 200b is ringing.

Eventually, the telephone is answered at UE 200b. The UA 200a then generates a SIP "200 OK" to indicate the telephone call has been answered and forwards the "200 OK" message towards the UA at UE 200a via nodes 400b, 400c and 400a. The UA at UE 200a receives the "200 OK" message, concludes that the telephone call has been answered at UE 200b, generates a SIP ACK (acknowledgement) message and forwards the ACK message towards the UA at UE 200b. The ACK message travels via nodes 400a, 400c and 400b to the UA at UE 200b which processes it and concludes that the telephone call (session) has been established.

Meanwhile, on receiving the ACK message, the P-CSCFs 400a, 400b know that a session has been successfully established between the UAs at UEs 200a, 200b and thus the P-CSCFs 400a, 400b establish subscriptions with the S-CSCF 400c to be notified of events that affect the registration of the UAs. Specifically, P-CSCF 400a enters into a subscription with the S-CSCF 400c to be notified of events that affect the registration of the UA at UE 200a and, likewise, P-CSCF 400b enters into a subscription with the S-CSCF 400c to be notified of events that affect the registration of the UA at UE 200b.

Figure 8A:
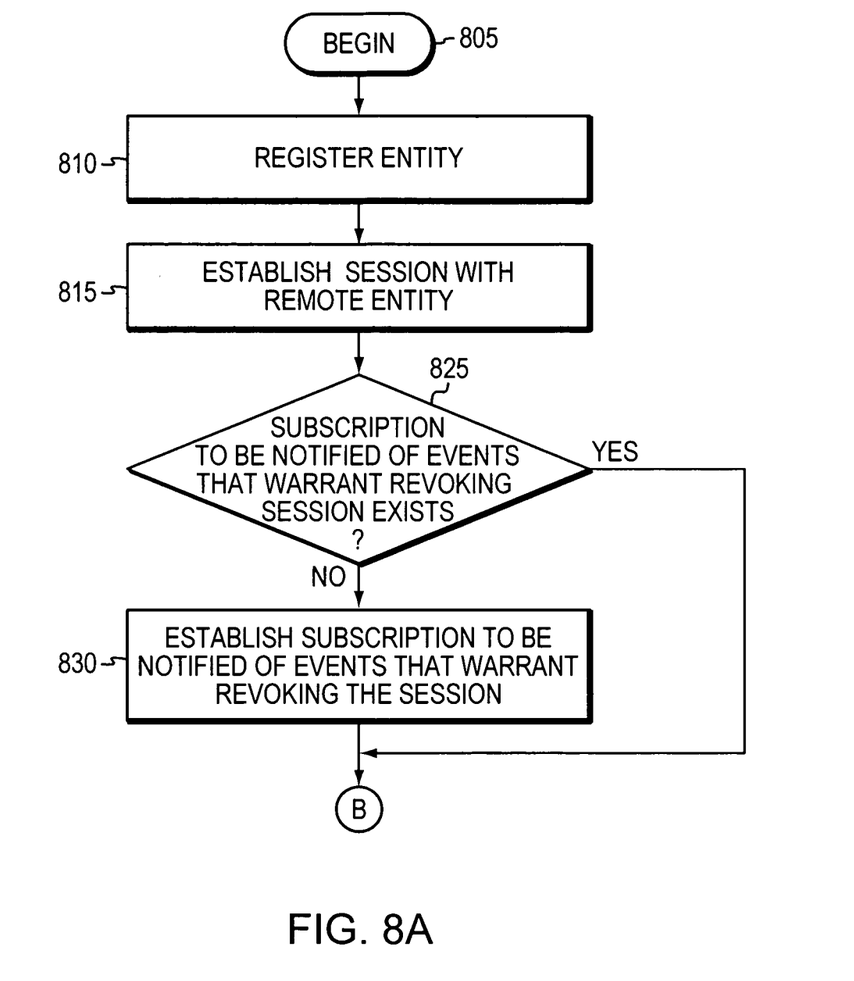
FIGS. 8A-B are a flow chart of a sequence of steps that may be used to manage a session between two UAs in accordance with an aspect of the present invention.
Figure 8B:
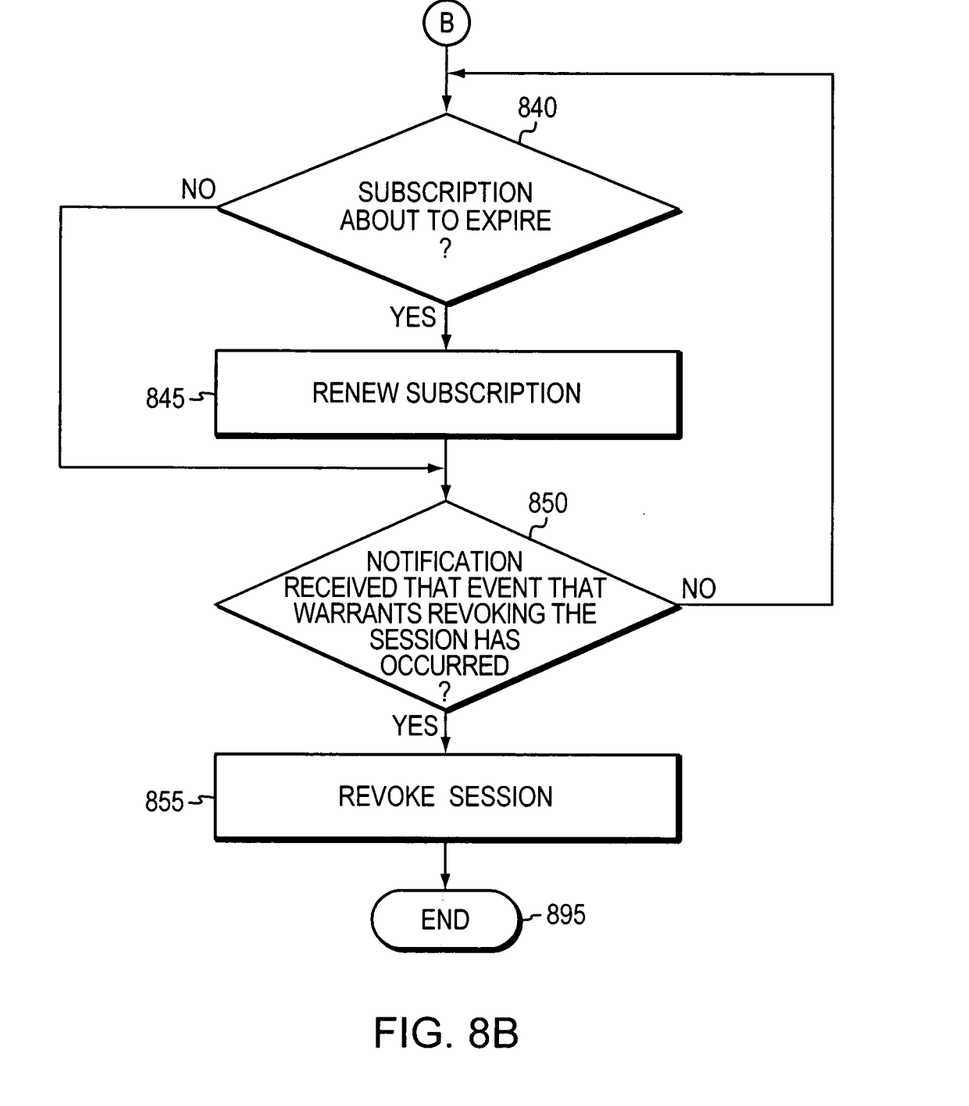

In accordance with an embodiment of the present invention, a subscription is established with an S-CSCF after a session has been established if the session is considered one that, e.g., the P-CSCF may determine, based on its assessment of the session, that the session is one that it is prepared to revoke should certain events (e.g., the registration status of the UA has changed such that it warrants revoking the session) occur. Here, the subscription provides notification of events that may warrant revoking the session (e.g., an existing registration associated with a UA participating in the session is "deregistered"). FIGS. 8A-B are a flow chart of a sequence of steps that may be used to, for a session that it is determined should be revoked if certain events occur, (1) establish a session between entities in a network, (2) establish a subscription to be notified of one or more events that warrant revoking the session, if the subscription does not already exist, and (3) revoke the session if such notification is provided.

The sequence begins at step 805 and proceeds to step 810 where an entity (e.g., a UA) associated with the session registers in the network, as described above. At step 815 a session between the entity and a remote entity is established. Otherwise, the sequence proceeds to step 825 where a check is performed to determine if a subscription to be notified of events that warrant revoking the session already exists. If so, the sequence proceeds to step 840 (FIG. 8B); otherwise, the sequence proceeds to step 830 where a subscription to be notified of events that warrant revoking the session is established.

Illustratively, subscriptions are limited as to time. That is, each subscription is considered active for a specified period of time. If the subscription is not renewed prior to that period of time, the subscription expires. To avoid expiration, at step 840, a check is performed to determine if the subscription established at step 825 is about to expire. If not, the sequence proceeds to step 850, otherwise, the sequence proceeds to step 845 where the subscription is renewed illustratively in accordance with the SIP protocol. At step 850, a check is performed to determine if a notification has been received of an event that has occurred that warrants revoking the session. If not, the sequence returns to step 840. Otherwise, the sequence proceeds to step 855 where in response to the notification, the session is revoked. The sequence ends at step 895.

For example, referring to FIG. 2, assume that a caller at UE 300a wishes to establish a session (e.g., a telephone call) with the called party at UE 300b. Further assume that the P-CSCFs associated with the UAs at UE 300a and 300b are P-CSCF 400a and P-CSCF 400b, respectively, and that the S-CSCF associated with the UAs is S-CSCF 400c.

Before establishing the session, each UA registers with the S-CSCF 400c as described above. Specifically, for each UA, the processor 320 (FIG. 3) generates a REGISTER message and transfers it via bus 325 to the network interface 340. The network interface 340 receives the REGISTER message and forwards it onto the network 200 to the S-CSCF 400c.

The P-CSCF 400 associated with the UA receives the REGISTER message and processes it including noting that the UA is attempting to register with the S-CSCF 400c and forwarding the message to the S-CSCF 400c. Specifically, the P-CSCF's network interface 410 (FIG. 4) receives the REGISTER message and forwards it via backplane 440 to the supervisor engine 500. The supervisor engine's interface logic 560 (FIG. 5) acquires the REGISTER message from the backplane 440 and places it in the packet buffer 540. The processor 520 accesses the message in the packet buffer 540 and processes it including (1) noting that the UA is registering with the S-CSCF 400c and (2) determining that the message should be forwarded to the S-CSCF 400c. The processor 520 directs the packet buffer 540 to transfer the message to the interface logic 560 which transfers the message via the backplane 440 to a network interface 410 through which the S-CSCF 400c can be reached. The network interface 410 places the message on the network 200 for transfer to the S-CSCF 400c.

The message travels via the network 200 to the S-CSCF 400c which processes the message including registering the UA and associating an Address of Record (AOR) with the UA so that requests sent to the AOR are forwarded to the UA. In addition, the S-CSCF 400c may determine if the UA is authorized to participate in sessions in the network 200 by authenticating the UA with the HSS 250.

Assuming the UA is authorized to participate in sessions in the network 200, the S-CSCF 400c generates and forwards a "200 OK" message to the UA. The "200 OK" message is received by the P-CSCF 400 associated with the UA which processes it noting that the UA has successfully registered with the S-CSCF. The UA receives the "200 OK" message and concludes that it has been properly registered with the S-CSCF 400c.

After the UAs have been registered, a session is then established between the UAs to accommodate the telephone call, as described above (step 815). After the telephone session has been established, the P-CSCF 400 determines if a subscription to be notified of events that warrant revoking the session already exists (step 825). Assuming this subscription does not exist, the P-CSCF 400 generates and forwards a SUBSCRIBE message to the S-CSCF 400c to subscribe to be notified of events associated with the registration of their associated UA. The S-CSCF 400c receives the SUBSCRIBE message and processes it including establishing a subscription in a conventional manner to notify the P-CSCF of events that occur that are associated with the registration of the UA associated with the P-CSCF, as described above (step 830).

The P-CSCF 400 then determines if the subscription with the S-CSCF is about to expire (step 840). If the subscription is about to expire, the P-CSCF 400 renews the subscription with the S-CSCF as described above. Assuming that the subscription is not about to expire, the P-CSCF 400 performs a check to determine if it has received notification (e.g., via a SIP NOTIFY message) of an event that warrants revoking the session (step 850).

Assuming that such an event has occurred and that the S-CSCF has issued a notification to the P-CSCFs, each P-CSCF receives the notification and concludes that an event has occurred that warrants revoking the session. Each P-CSCF then revokes the session by notifying its UA that the session is to be revoked (step 855). The UAs receive the notifications and tear down the session between them in a conventional manner.

It should be noted that the UA may have established multiple revocable sessions. Here, the revocable sessions would all be revoked at step 855. Moreover, the UA may have established one or more non-revocable sessions after a subscription has been established. Here, although the sessions may terminate, in accordance with an aspect of the present invention, the subscription is not terminated and allowed to expire. Advantageously, this acts to further reduce messaging activity as messages are not sent to terminate (cancel) the subscription.

It should be further noted that in some embodiments of the invention, rather than establishing a subscription to be notified of events that warrant revoking a session immediately after the session is established, a delay is introduced between the establishment of the session and the establishment of the subscription (e.g., the establishment of the subscription is delayed after the establishment of the session until a period of time has expired). Introducing a delay may further act to reduce unnecessary messaging traffic that may be associated with unintended but established short sessions (e.g., dialing a wrong number).

Aspects of the invention as described above are described as being implemented on e.g., a router. This is not intended to be a limitation of the invention. One or more nodes each containing one or more processors and memories may be adapted to implement aspects of the above described techniques. It should be also noted that the above-described P-CSCF and S-CSCF may reside on one or more nodes in a communication network that implements the present invention. Moreover, the nodes may be, e.g., servers contained in the network.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for managing, by a proxy server, communication sessions between entities in a communication network, the method comprising:
- registering an entity with a session control server in order for the entity to participate in communication sessions in the communication network;
- after registering the entity, conveying messages between the entity and the session control server that establish a communication session between the entity and the at least one other entity in the communication network;
- in response to establishment of the communication session, establishing a subscription between the proxy server and the session control server that enables the proxy server to be notified of events relating to a registration status of the entity, such that establishing the subscription is delayed relative to registering the entity; and
- after establishing the subscription, revoking the communication session between the entity and the at least one other entity in response to being notified of an event relating to the registration status that warrants revoking the communication session.

2. A method as defined in claim 1 wherein the notification is a Session Initiation Protocol (SIP) NOTIFY message.

3. A method as defined in claim 1 wherein an event associated with revoking the communication session includes deregistering an existing registration of an entity associated with the communication session.

4. A method as defined in claim 1 wherein establishing the subscription comprises sending a subscription message to the session control server to establish the subscription.

5. A method as defined in claim 4 wherein the subscription message is a SIP SUBSCRIBE message.

6. A method as defined in claim 1 wherein the communication session is a telephone call between the entity and the at least one other entity, each comprising User Agents (UA).

7. A server in a communication network comprising:
- a memory; and
- a processor coupled to the memory, the processor configured to:
  (1) register an entity with a session control server in order for the entity to participate in communication sessions in the communication network;
  (2) after registration of the entity, convey messages between the entity and the session control server that establish a communication session between the entity and at least one other entity in the communication network;
  (3) in response to establishment of the communication session, establish a subscription between the proxy server and the session control server that enables the proxy server to be notified of events relating to a registration status of the entity, such that establishment of the subscription is delayed relative to registration of the entity; and
  (4) after establishment of the subscription, revoke the communication session between the entity and the at least one other entity in response to being notified of an event relating to the registration status that warrants revocation of the communication session.

8. A server as defined in claim 7 wherein the entity is an intermediate node.

9. A server as defined in claim 7 wherein the entity is a user equipment (UE).

10. An apparatus for managing communication sessions with entities in a communication network, the apparatus comprising:
- means for registering a user equipment device in order for the user equipment device to participate in communication sessions in the communication network;
- means for conveying messages between the entity and the session control server, after registration of the entity, that establish a communication session between the entity and at least one other entity in the communication network;
- means for establishing a subscription between the proxy server and the session control server in response to establishment of the communication session, the subscription enabling the proxy server to be notified of events relating to a registration status of the entity, such that establishing the subscription is delayed relative to registering the entity; and
- means for revoking the communication session between the entity and the at least one other entity, after establishing the subscription, in response to being notified of an event relating to the registration status that warrants revoking the communication session.

* * * * *

UNITED STATES PATENT AND TRADEMARK OFFICE
CERTIFICATE OF CORRECTION

PATENT NO. : 9,258,367 B2
APPLICATION NO. : 11/497704
DATED : February 9, 2016
INVENTOR(S) : Paul Kyzivat It is certified that error appears in the above-identified patent and that said Letters Patent is hereby corrected as shown below:

In the Claims

In Col. 11, line 10, delete "the" (second occurrence).

Signed and Sealed this
Fourteenth Day of June, 2016

Michelle K. Lee
*Director of the United States Patent and Trademark Office*